United States Patent [19]
Digman et al.

[11] Patent Number: 6,116,008
[45] Date of Patent: Sep. 12, 2000

[54] PIVOTING FACEPLATE FOR A FEEDERHOUSE ON AN AGRICULTURAL COMBINE

[75] Inventors: Michael J. Digman, Denver; James D. Walker, Lititz; James Bennett, Narvon, all of Pa.

[73] Assignee: New Holland North America, Inc., New Holland, Pa.

[21] Appl. No.: 09/285,141

[22] Filed: Apr. 1, 1999

[51] Int. Cl.[7] .......................... A01D 34/03; A01D 34/43; A01D 34/64
[52] U.S. Cl. ...................... 56/15.8; 56/15.9; 56/208
[58] Field of Search .................... 56/14.5, 14.3, 56/16.4 R, 16.5, 365, 301, 303, 14.9, 15.6, 15.8, 15.9, 16.1, 16.2, DIG. 14, DIG. 1, DIG. 11, 1.9, 208, 10.4

[56] References Cited

U.S. PATENT DOCUMENTS

| | | | |
|---|---|---|---|
| 3,638,407 | 2/1972 | Togami | 56/15.6 |
| 3,699,754 | 10/1972 | Koch et al. | 56/15.8 |
| 3,713,284 | 1/1973 | Dankel et al. | 56/364 |
| 3,729,907 | 5/1973 | Burrough et al. | 56/14.1 |
| 3,731,470 | 5/1973 | Cornish et al. | 56/10.4 |
| 3,959,957 | 6/1976 | Halls | 56/208 |
| 4,011,709 | 3/1977 | Mott et al. | 56/10.4 |
| 4,206,583 | 6/1980 | Week et al. | 56/15.8 |
| 4,266,392 | 5/1981 | Knepper et al. | 56/14.5 |
| 4,266,395 | 5/1981 | Basham | 56/209 |
| 4,332,262 | 6/1982 | De Busscher | 130/27 P |
| 4,522,553 | 6/1985 | Nelson et al. | 414/526 |
| 4,707,972 | 11/1987 | Knepper | 56/10.2 |
| 4,800,711 | 1/1989 | Hurlburt et al. | 56/219 |
| 4,846,198 | 7/1989 | Carnewal et al. | 460/21 |
| 4,866,920 | 9/1989 | Kerckhove et al. | 56/16.6 |
| 4,907,402 | 3/1990 | Pakosh | 56/14.6 |
| 4,967,544 | 11/1990 | Ziegler et al. | 56/10.2 |
| 5,142,852 | 9/1992 | Nelson | 56/16.6 |
| 5,155,984 | 10/1992 | Sheehan | 56/10.2 |

*Primary Examiner*—Robert F. Pezzuto
*Assistant Examiner*—Arpad Fabian Kovacs
*Attorney, Agent, or Firm*—J. William Stader; Larry W. Miller

[57] ABSTRACT

The invention discloses improvements to a feederhouse on an agricultural combine. These improvements include a pivoting faceplate between the header and feederhouse. The pivoting faceplate has faceplate position indicia to assist an operator in properly positioning the faceplate. The invention also includes a front drum adjustment mechanism, which use a cam with cam position indicia to properly position the front drum. There is also a stone roll mount plate permitting the proper adjustment of the stone roll relative to the feederhouse floor. There are also stone roll position indicia and a pointer to help position the stone roll.

5 Claims, 9 Drawing Sheets

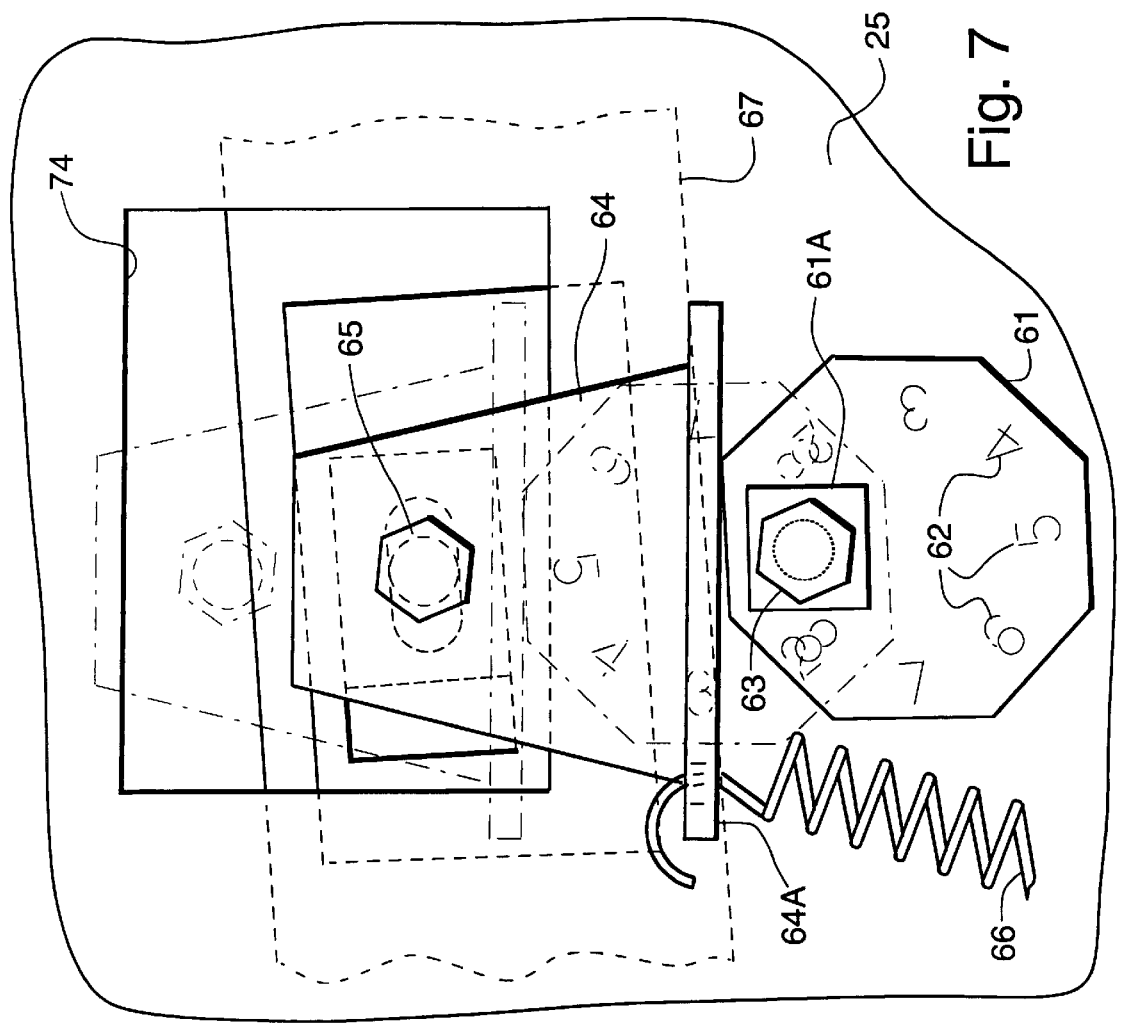
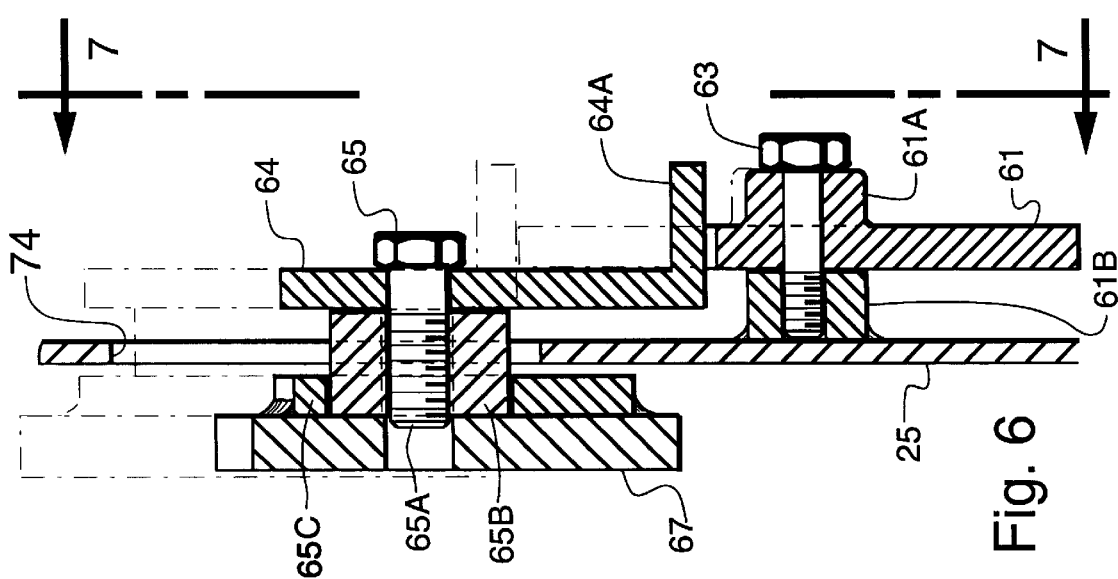

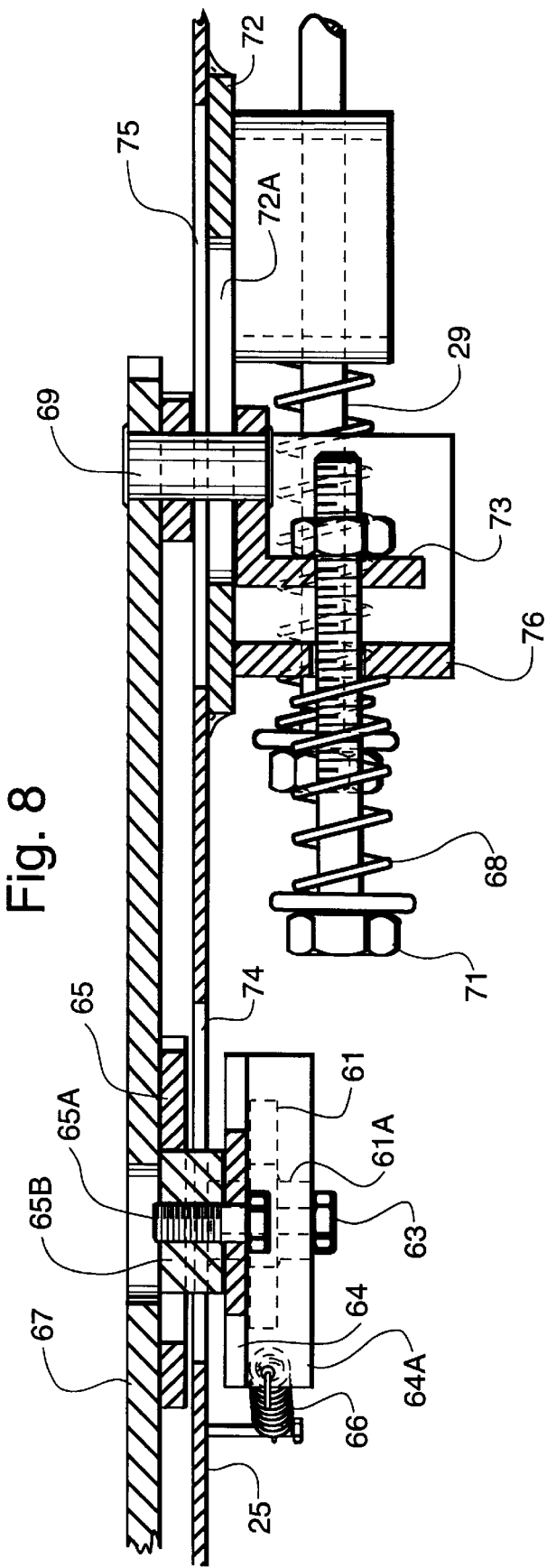

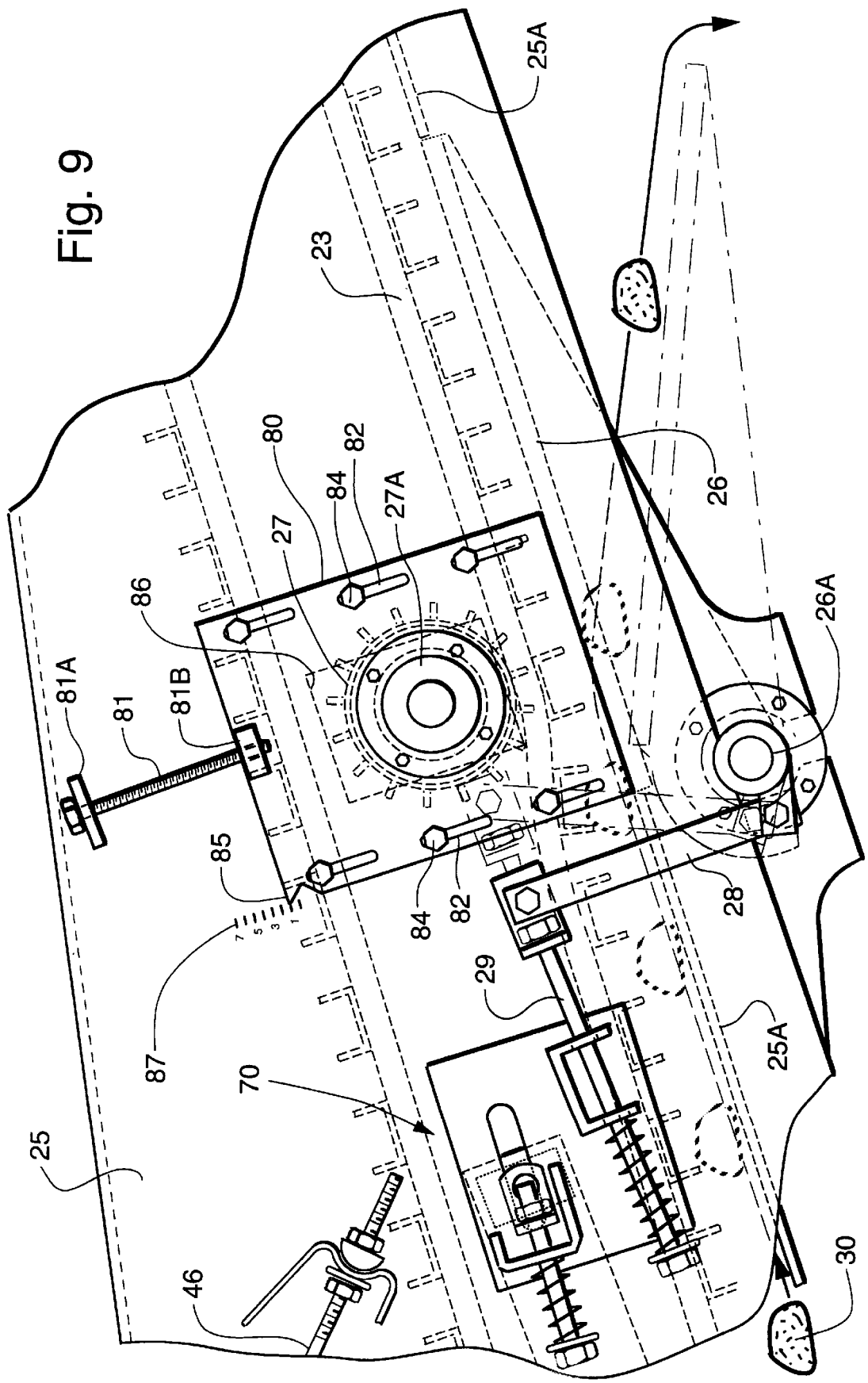

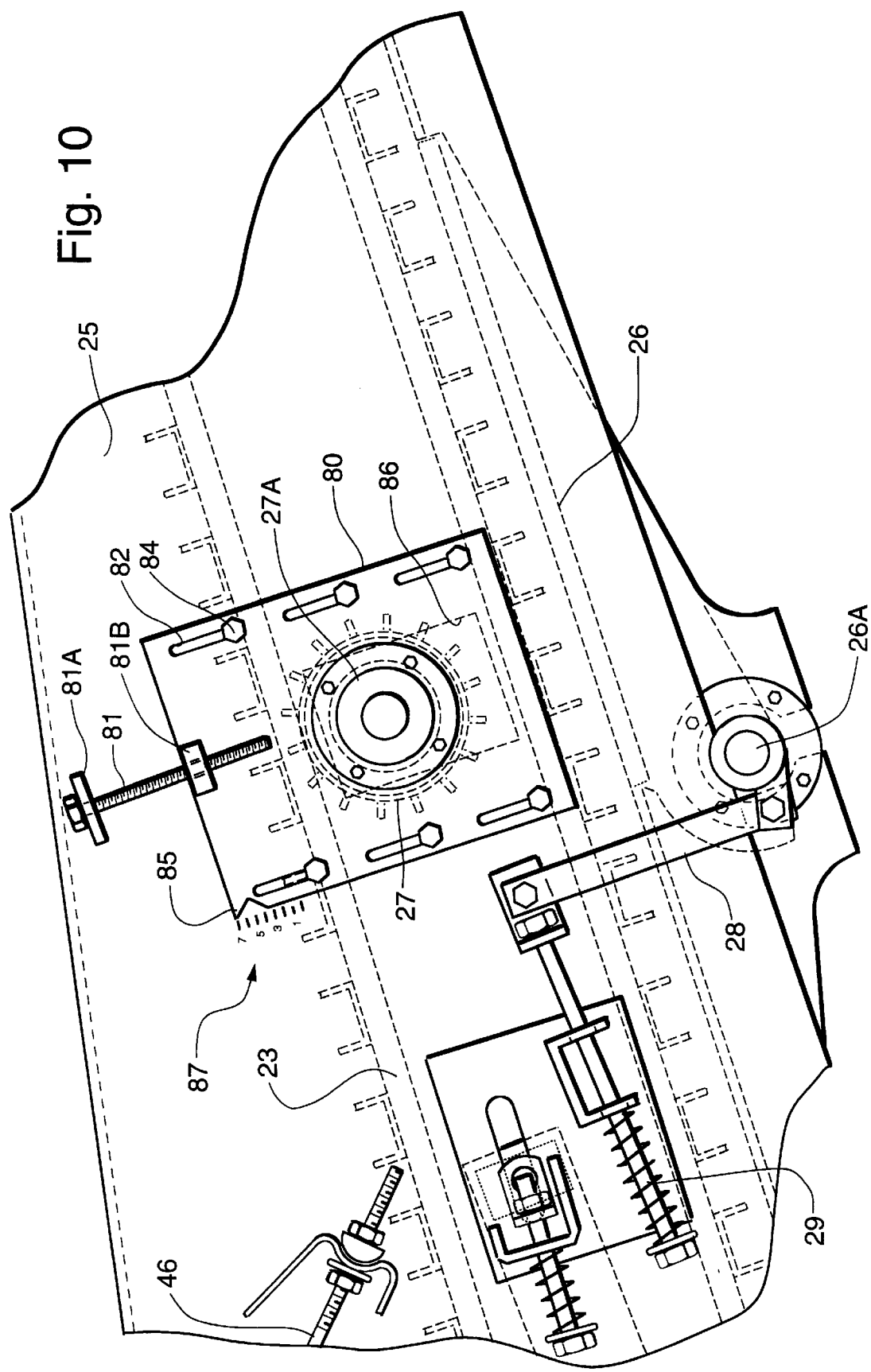

PIVOTING FACEPLATE FOR A FEEDERHOUSE ON AN AGRICULTURAL COMBINE

BACKGROUND OF INVENTION

1. Field of Art

This invention relates to the improvement of a feederhouse on an agricultural combine. More specifically, the invention allows for the adjustment of the front drum of the feederhouse, the adjustment of a pivoting faceplate on the feederhouse and the adjustment of a stone roll in a feederhouse.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing and separation areas of the combine. The grain is separated from the stalk by a rotor or threshing system. The grain is then moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™ 66, TX™ 68, the New Holland TWIN ROTOR® combines TR® 89 and TR® 99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

The previously mentioned a feederhouse typically consists of a conveying chain which pushes the cut crop from the header to the front of the threshing system. The conveying chain has several cross pieces to assist in moving the crop and to ensure proper spacing. The conveying chain is powered and also positioned by a front drum and a rear drum. The front drum is positioned approximately behind the header and the rear drum is positioned approximately in front of the threshing system. As seen in FIG. 1, the drums rotate in a counter-clockwise fashion. The cut crop flow or crop mat is pushed by conveyor chain upwards along the floor of the feederhouse and towards the threshing system. Besides lifting or elevating the cut crop to the threshing and separating systems, the feederhouse provides several other functions. First, the feederhouse helps to properly position the header relative to the ground. Second, the feederhouse can be the location of a stone detection and removal means. Frequently, during farming operations, the header will inadvertently receive a stone. If the stone enters the threshing system in the combine, expensive damage will result to the threshing components. It is a critical function of a stone detection and removal system to prevent a stone from damaging the threshing system. A typical stone detection and removal system is a cylindrical stone beater or stone roll positioned near the mid-point of the feederhouse. The stone roll rotates allowing the crop mat to continue towards the rear drum and threshing system. A stone that is too large is forced from the feederhouse through a stone trap door beneath the stone roll.

Unfortunately there are several deficiencies to the current feederhouse design. For instance, it is difficult to accurately position the feederhouse relative to the header. Furthermore, it is difficult to properly adjust the position of the front drum of the feederhouse. Frequently it is desirable to adjust the position of the front drum depending on the crop and farming conditions. By adjusting the distance of the front roll from the bottom of the feederhouse, the thickness of the crop mat flowing through the feederhouse may be increased or decreased. It is also difficult to adjust the stone roll. Depending on the crop and field conditions, it is desirable to move the stone roll either closer or farther from the feederhouse floor. If the stone roll is moved too close to the feederhouse floor, the amount of crop able to be elevated to the threshing system could be undesirably decreased. Conversely, if the stone roll is positioned too high, then a stone may enter the threshing system catastrophically damaging the combine.

An invention that could resolve these issues would represent an improvement to the art.

OBJECTS OF THE INVENTION

It is an object of the present invention to provide a pivoting faceplate between the feederhouse and header.

It is an object of the present invention to provide a method of adjusting the faceplate between the feederhouse and header.

It is an object of the present invention to provide a pivoting faceplate that would allow an operator to determine the adjustment being made concerning the position of the faceplate.

It is an object of the present invention to provide a front drum adjustment mechanism for a feederhouse.

It is an object of the present invention to provide a method of adjusting the front drum of a feederhouse.

It is an object of the present invention to provide a front drum adjustment mechanism that would allow an operator to determine the position of the front drum.

It is an object of the present invention to provide a front drum adjustment mechanism that allows for slight changes in the size of the crop flow.

It is an object of the present invention to provide a stone roll mount plate to which a stone roll is attached.

It is an object of the present invention to provide a method to adjust a stone roll mount plate.

It is an object of the present invention to provide a stone roll plate that would allow an operator to determine the position of the stone roll.

SUMMARY OF THE INVENTION

The invention is an improvement to the feederhouse on an agricultural combine. The invention consists of a pivoting faceplate positioned between the feederhouse and header. The faceplate is pivotally attached to the sidewall of the feederhouse. A faceplate adjustment rod rotates the faceplate about the pivot. There are several faceplate position indicia that are viewed through an indicator aperture to assist an operator in positioning the faceplate correctly. The invention also includes a method for adjusting the faceplate. The invention further includes a front drum adjustment mechanism. The front drum of the feederhouse is rotationally mounted on a drum arm. The drum arm is pivotally attached to the sidewall. There is an arm pivot mount that has a drum arm spring allowing the drum arm to adjust to minor position changes in the crop flow. There is a cam attached to the sidewall that slideably contacts and positions an adjustment plate that is attached to the drum arm. This adjustment allows the position of the front drum to be adjusted by viewing several cam position indicia on the cam. The invention also discusses a method for adjusting the position of the front drum. The invention further consists of a stone roll mount plate. The stone roll is attached to the mount plate. Several plate bolts attach the mount plate to the sidewall. A roll adjust rod allows the stone roll mount plate and attached stone roll to be moved either closer or further from the feederhouse floor. There is a pointer that may be aligned with a stone roll position indicia to properly adjust the stone roll. The invention further reveals a method to adjust the stone roll position.

BRIEF DESCRIPTION OF DRAWINGS

The advantages of this invention will be apparent upon consideration of the following detailed disclosure of the invention, especially when taken in conjunction with the accompanying drawings wherein:

FIG. 6 is a detailed sectional view of the cam taken on the line 6—6 of FIG. 5.

FIG. 7 is a side elevation of the structure of FIG. 6 showing two positions of the cam.

FIG. 8 is an enlarged sectional view of the pivot arm taken on the line 8—8 of FIG. 5 showing the drum arm spring and arm pivot mount.

FIG. 9 is an enlarged side elevation of the portion of the feederhouse involving the stone trap door with the stone roll mounted on the stone roll mount plate. The stone roll mount plate is set at the lowest setting. The view shows a rock path through the feederhouse flexing the conveyor chains upwardly until the stone encounters the stone roll which forces the conveyor chain down to open the stone trap door.

FIG. 10 is a view similar to FIG. 9, but with the stone roll mount plate at its top position (the pointer is aligned with the stone roll position indicia '7'). The stone roll is raised higher and would require a bigger stone to open the stone trap door.

DETAILED DESCRIPTION OF THE INVENTION

Figure 1:
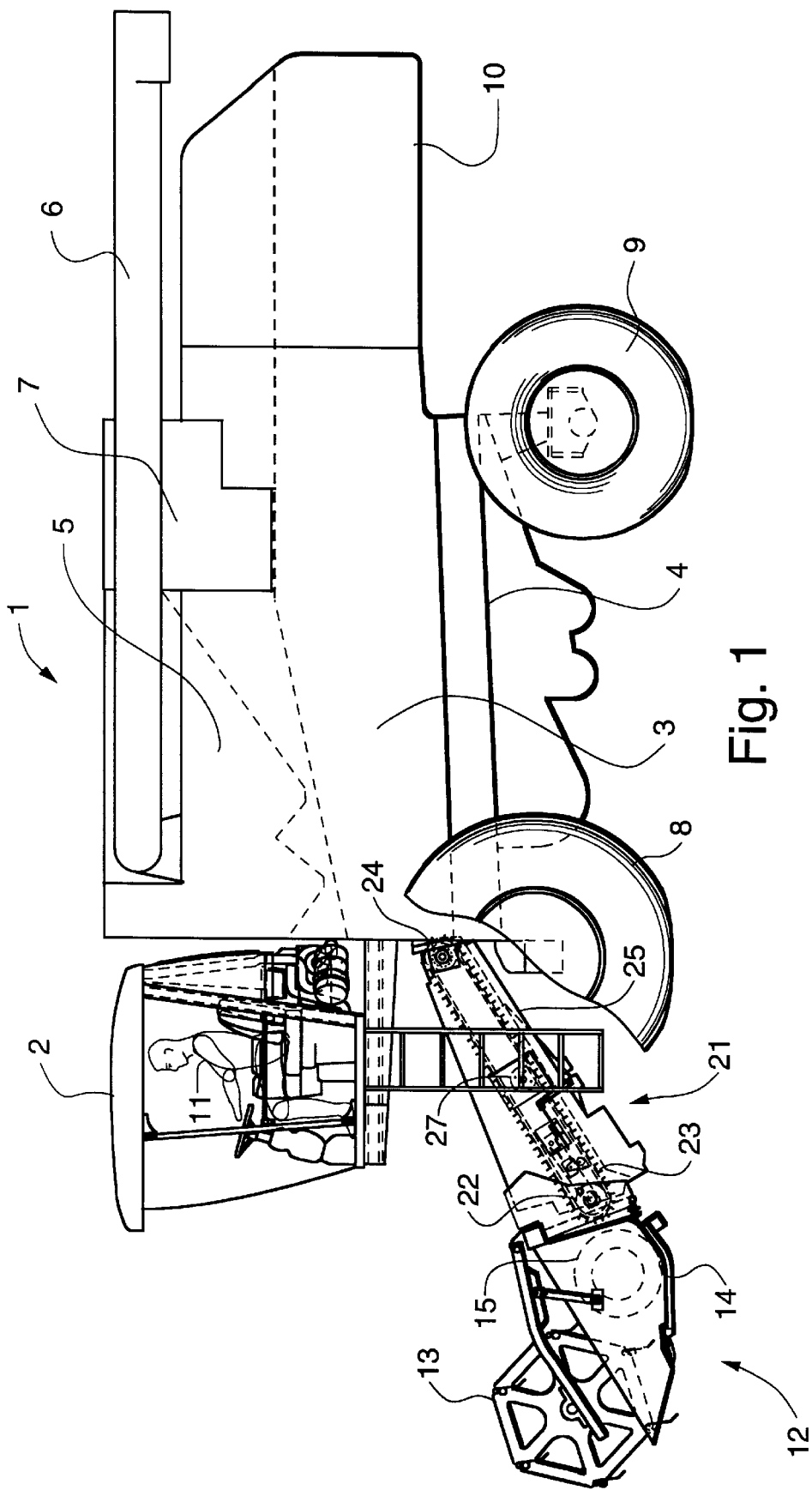
FIG. 1 is an over-all side elevation of a combine equipped with a feederhouse and a header.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

As seen in FIG. 1, the invention is located on a typical twin rotor combine I having a pair of front wheels 8 (only one shown) and a pair of rear wheels 9 (only one shown) for providing movement over the ground. At the front of the combine is a header 12 for cutting a crop. As the combine 1 and header 12 are moved forward, the header 12 cuts the grain and stalk. The header 12 moves the grain into an auger trough 14. A transverse auger 15 pushes the grain and stalk in the auger trough 14 to the center of the header. The header 12 illustrated in FIG. 1 is a wheat or similar small grain header. The header 12 may be positioned and repositioned relative to the ground. The header 12 may also be tilted to the left or right or may be positioned relatively high or low to the ground. These features are constantly being adjusted depending on the terrain and crop conditions. The header reel 13 may also be positioned relative to the header 12. The position and rotation of the header reel 13, again depends on the terrain and crop conditions. Moveable headers and header reels are well known and established in the art. Located at the center of the header is the feederhouse 21 or elevator. The feederhouse 21 moves the grain and stalks rearward into the threshing 3, separation 4 and cleaning systems of the combine 1. After processing and separation, the processed grain is stored in a grain tank 5 located near the top of the combine 1. The grain is removed from the grain tank 5 by an unloading auger (not shown) through the grain tank unload tube 6. Usually during the harvesting operations, the unloading auger remains off and the grain tank unload tube 6 remains positioned by the grain tank 5. However, the combine can be unloaded 'on the go'. A separate vehicle such as a truck or tractor-pulled grain cart follows the operator. The processed grain is discharged while the combine and separate vehicles are moving. After sufficient grain has been accumulated in the grain tank 5, the operator activates the unload tube 7. The operator 11 then positions the end of the unload tube 6 over a receptacle. Unloading augers and unload auger grain tubes are well known and established in the art. The trash or chaff is ejected from the rear of the combine by a chaff spreader 10. The operator 11 controls the combine 1 from the cab 2 located behind the header 12 and at the front of the combine. From the cab the operator can observe most the various combine functions. The cab 2 usually has a large glass window or several windows which afford the operator the maximum ability to monitor the header 12. The combine 1 and various systems are powered by an engine 7 generally positioned at the rear of the combine 1. Most of the major systems in a combine are discussed and well known in the prior art.

The invention is located proximate to the feederhouse 21 of the combine 1. The pivoting faceplate 40 can be seen in generally in FIG. 2 and more specifically in FIGS. 3 and 4. The pivoting faceplate 40 is located between the feederhouse 21 and the header 12. The pivoting faceplate 40 allows the header 12 to be re-positioned relative to the ground. This is illustrated by observing the position of the auger trough 15 and sicklebar cutter 17 relative to the ground as viewed in FIGS. 3 and 4. The description of the faceplate 40 that follows is oriented towards the left side of the feederhouse 21, however an identical structure exists on the right side.

Figure 2:
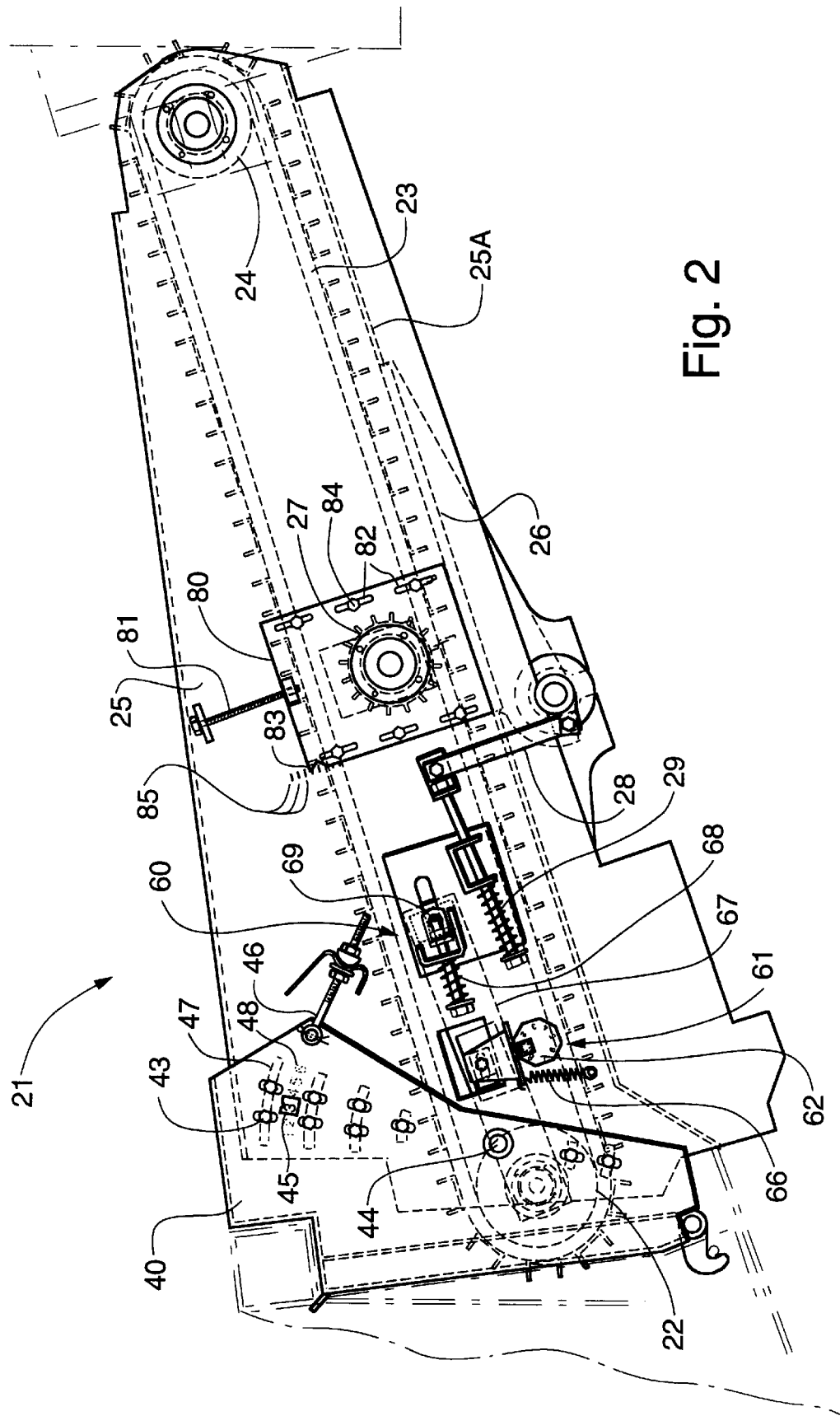
FIG. 2 is an enlarged side elevation of the feederhouse.
Figure 3:
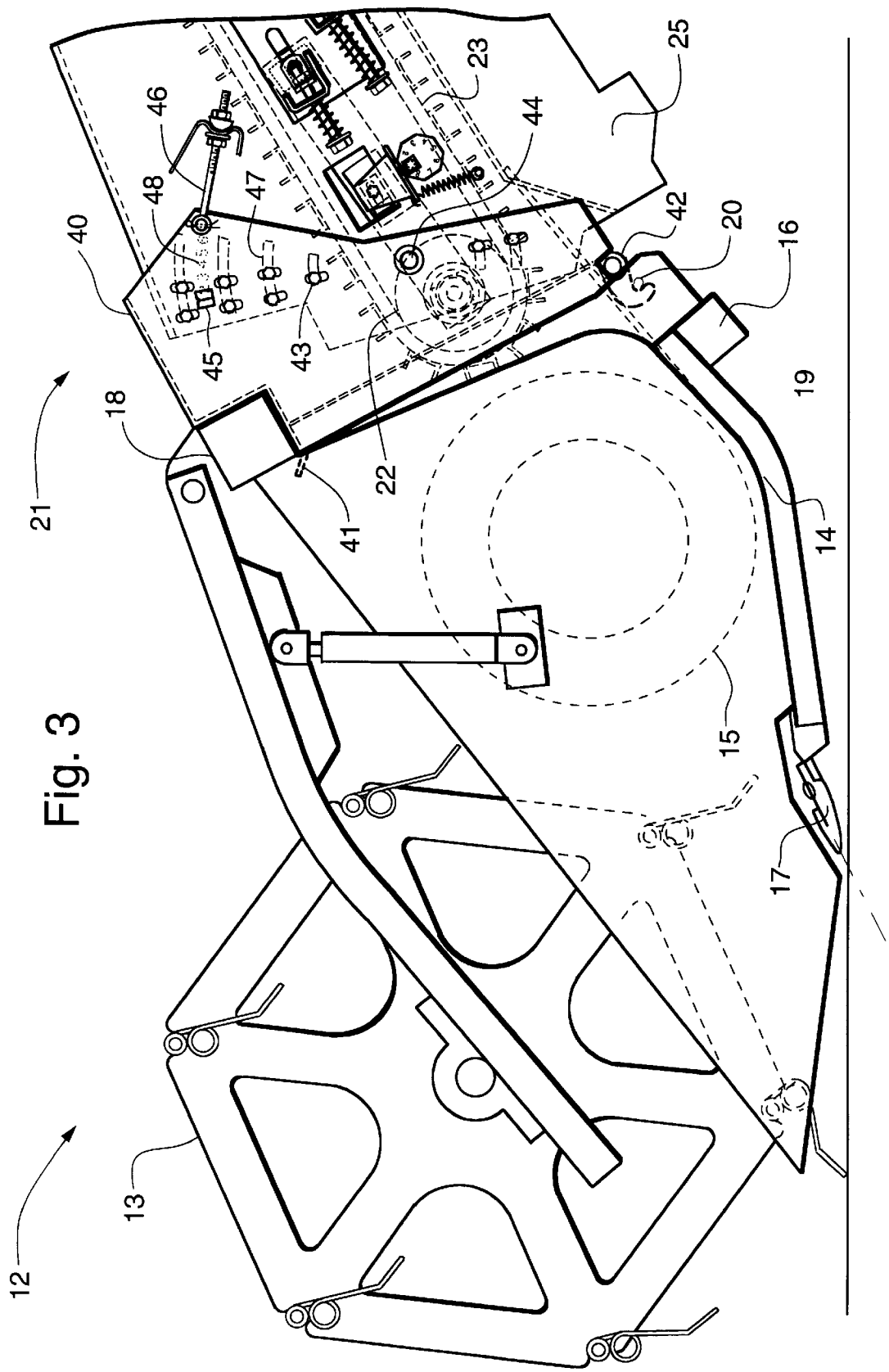
FIG. 3 is a fragmentary enlarged view of the pivoting faceplate on the front portion of the feederhouse showing it pivoted counter-clock wise to the maximum header tilt down position. The faceplate position indicia '1' shows in the indicator aperture.
Figure 4:
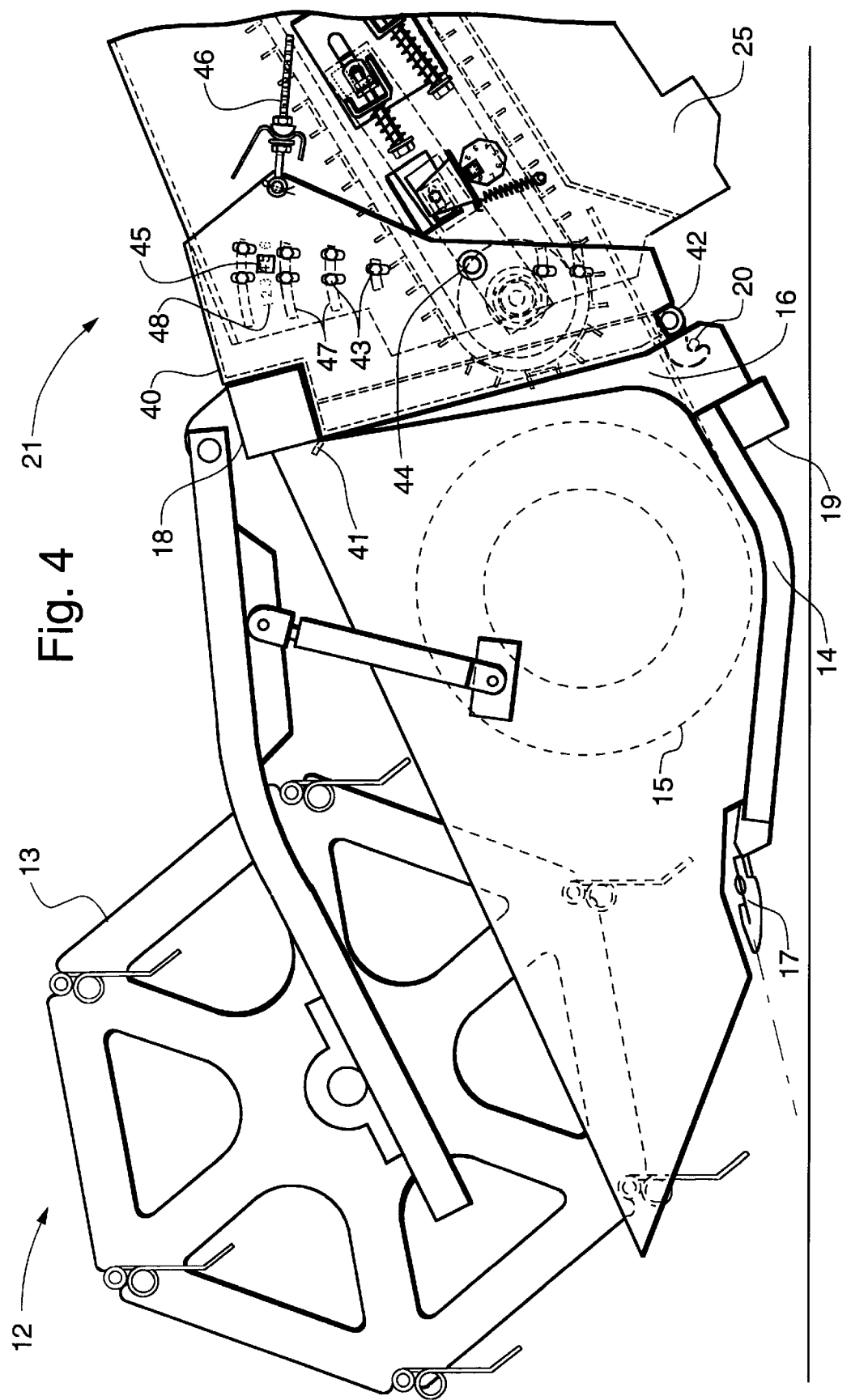
FIG. 4 is similar to FIG. 3, but shows the pivoting faceplate tilted clockwise to the tilt the header up to where the faceplate position indicia '4 & 5' are showing in the window.
Figure 5:
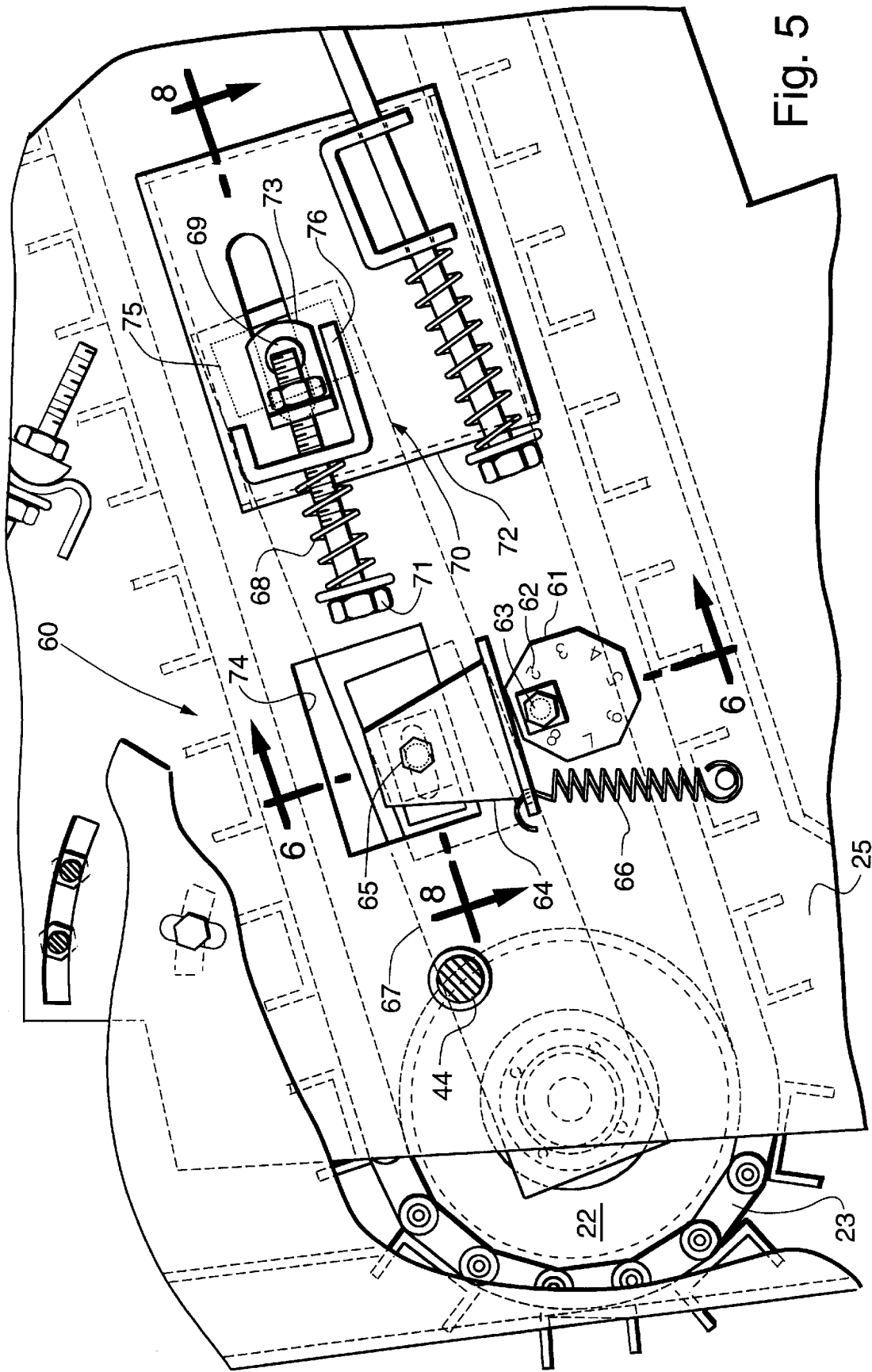
FIG. 5 is a fragmentary enlargement of a front portion of the feederhouse seen in the previous figures with the pivoting faceplate broken away to better show the pivot arm, the cam and arm pivot mount.

For brevity purposes on the one side is discussed. The faceplate 40 is pivotally attached to the sidewall 25 of the feederhouse 21 by a pivot 44. The faceplate 40 can rotate about the pivot 44 and relative to the sidewall 25. There are a series of clamping means 43 which in this embodiment is a threaded bolt that are inserted into an arcuate slot 47. There are several arcuate slots 47 positioned on the sidewall 25 of the feederhouse. The curved nature of these slots relative to the pivot 44 allows for the faceplate to be adjusted to a variety of positions and clamped into a desirable angle. To properly adjust the faceplate 40, there is a faceplate adjustment rod 46. This rod 46 has an end pivotally affixed to the faceplate 40. The opposite end of the rod 46 inserted through a bracket affixed to the sidewall 46. In the illustrated preferred embodiment, the rod 46 is threaded and a matching nut is affixed to the bracket on the sidewall 25. After loosening the clamping means 43, the faceplate adjustment rod 46 may be rotated to adjust the position of the faceplate 40. Also present on the faceplate 40 is an indicator aperture 45. On the sidewall 25 there are a series of faceplate position indicia 48. A single indicia 48 can be viewed through the indicator aperture 45 when the aperture 45 is aligned with an indicia 48 on the sidewall. This allows an operator to easily determine the position of the faceplate 40 relative to the feederhouse 21. The indicia 48 illustrated in FIGS. 2, 3 and 4 are the numerals 1 through 5, however other descriptive indicia could be used. Attached at the front of the feederhouse 21 and pivoting faceplate 40 is the header 12. The faceplate 40 has a header cradle 41 supporting the top frame 18 of the header 12. A trough pin attach 42 on the faceplate 40 attaches to a trough pin 20. The trough pin 20 is affixed to the header frame 16. Attached to the header frame 16 are the trough frame and the auger trough 14. Attached to the auger trough is the previously mentioned sicklebar cutter 17. Above the auger trough 14 is the previously discussed transverse auger 15. While the header described is a small grain or wheat header, other types of header such a corn header can be used with the pivoting faceplate 40 without any significant modification to the header cradle 41 or trough pin attach 42. To adjust the position of the faceplate 40, the clamping means 43 are loosened. The adjustment rod 46 and nut are adjusted allowing the faceplate to rotate about the pivot 44. The operator can observe the position of the faceplate 40 by viewing the faceplate position indicia 48 through the indicator aperture 45. When a proper position indicia 48 is observed through the indicator aperture 45, the clamping means are tightened thus securing the faceplate 40 in a desirable position.

The front drum adjustment mechanism 60 can be generally observed in FIG. 2 and specifically seen in FIGS. 5, 6, 7 and 8. The front drum adjustment mechanism 60 allows the front drum and the conveyor chain 23 to be positioned either closer or further to the feederhouse floor 25A. The front drum adjustment mechanism also has a drum arm spring 69 which acts to allow slight movement is the position of the front drum 22 to adjust to various inconsistencies in the crop flow moving through the feederhouse 21. The front drum adjustment mechanism 60 consists of a drum arm 67 that is pivotally attached to the sidewall 25 of the feederhouse 21. The front drum 22 is rotationally attached to the drum arm 67. To adjust the position of the drum arm 67 there is a cam 61 attached to the sidewall 25 by a cam bolt 63. The cam contacts an adjustment plate 64. The adjustment plate 64 is attached to the drum arm 67. By rotating the cam, the adjustment plate 64 alters the position of the drum arm 67. By raising or lowering the drum arm 67, the front drum 22 is re-positioned. There are additional features and components that will be described in greater detail later. Opposite from the front drum 22 on the drum arm 67 is the arm pivot mount 70. As seen in FIG. 8, the drum arm 67 has an arm pivot 69. The arm pivot 69 passes through the pivot aperture 75 and through the wall plate aperture 72A. The arm pivot 69 is rotationally attached to the pivot plate 73. The pivot plate is affixed to the wall plate 72. The wall plate 72 is affixed to the sidewall 25. Inserted into the pivot plate 73 is the threaded spring bolt 71 which secured by a nut. The spring bolt 71 also passes through the tension bracket 76. Between the tension bracket 76 and the end of the spring bolt 71 is the drum arm spring 68. The spring bolt 71 allows the arm pivot mount 70 to adjust to minor inconsistencies in the crop flow which would otherwise damage the front drum 22 or conveyor chain 23. If the front drum 23 or conveyor chain was to shift, the pivot plate 73 could move to either the left or right (when viewed FIG. 5). The drum arm spring 68 would allow this brief position change and then return the arm pivot 69 to its normal position. If a more permanent adjustment is desired, the cam 61 can be adjusted. The cam 61 has several cam position indicia 62. It the preferred embodiment, the number 1–8 are used as indicia 62. However, other symbols may be used. Furthermore, the cam 61 is eight-sided, but the shape of the cam 61 may be varied. The cam 61 is secured to the sidewall 25 by a cam bolt 63 which is inserted into the nut 61B welded to the sidewall 25. There is a bolt guide 61A (seen in FIG. 6) which allows the easy insertion of the cam bolt 63 into the cam without marring the cam position indicia 62. The edge of the cam 61 slideably contacts the adjustment plate lip 64. The adjustment plate lip 64 is integral with the adjustment plate 64. The adjustment plate 64 is secured to the drum arm 67 by a plate attach means 65. In this embodiment, the attach means 65 is a threaded bolt inserted in the plate nut 65. The plate nut 65B is welded to the drum arm 67. The plate nut 65B and plate attach means 65 are inserted through the adjustment aperture 74 in the sidewall 25. Obviously, there are several means available to affix the adjustment plate to the drum arm 67. To insure that the adjustment plate 64 remains in slideable contact with the cam 61, there is a tensioning spring 66 secured to the adjustment plate lip 64A and the sidewall 25. The tensioning spring 66 forces the adjustment plate 64 into contact with the cam 61. To adjust the front drum position, the cam bolt 63 is loosened and the cam 61 is rotated to align a single cam position indicia 62 with the adjustment plate lip 64A on the adjustment plate 64. In the present embodiment, a single side of eight-sided cam 61 is brought into flush contact with the lip 64A. The cam bolt is then tightened. While the front drum adjustment mechanism 60 described and illustrated above is located on the left side of the feederhouse 21, there is the identical mechanism on the right side. For brevity purposes, only the mechanism on the left side has been discussed.

The stone roll mount plate 80 can be generally observed in FIG. 2 and specifically seen in FIGS. 9 and 10. Attached to the stone roll mount plate 80 is the stone roll 27. By raising or lowering the stone roll mount plate, the stone roll 27 is positioned either further or closer to the feederhouse floor 25A. The position of the stone roll 27 will adjust the size of a stone 30 which is pushed by the stone roll 27 through the stone trap door 26. The stone roll mount plate is affixed on the sidewall 25 by a series of plate bolts 84. A plate bolt 84 is inserted through a plate slot 82 in the stone roll mount plate 80. In the preferred embodiment, there are six plate slots which each receive a single plate bolt 84. The stone roll mount plate 80 covers the stone roll aperture 86 in the sidewall 25. The stone roll 27 is inserted through the stone roll aperture 86 and is rotationally attached to the stone roll mount plate 80. There is a roll adjust rod 81 which adjusts the position of the stone roll mount plate 80 and the attached stone roll 27. The rod 81 is threaded and inserted into a roll nut 81B. The roll nut 81B is welded to the stone roll mount plate 80. The opposite end of the rod 81 is attached to the sidewall 25 by the roll bracket 81A. As mentioned previously, the stone roll 27 deflects the conveyor chain 23. When a stone 30 which is too large to pass between the compressed conveyor chain 23 and the feederhouse floor 25A, the stone trap door 26 pivots open discharging the stone 30 (as seen in FIG. 9). The stone trap door 26 is pivotally attached to the feederhouse 21 beneath the sidewall 25. There is a door linkage attached to the stone door pivot 26 A. The door linkage 28 is controlled by the door spring linkage 29. One end of this linkage 29 is attached to the door linkage 28 and the sidewall 29. The stone roll 27 forces the stone 30 out of the feederhouse 21, the door linkage 28 and door spring linkage 29 pull the stone trap door 26 shut. To help adjust the position of the stone roll 27, there are a series of stone roll position indicia 87 affixed on the sidewall 25. In the preferred embodiment, the indicia are the numerals 1 through 7. However, several different indicia are possible. On the upper left corner of the stone roll mount plate 80 is a pointer 83. The pointer could also be re-configured to be an aperture as the indicator aperture 45 on the pivoting faceplate. To adjust the position of the stone roll 27, the operator loosens the plate bolts securing the stone roll mount plate 80 to the sidewall 25. The roll adjust rod 81 is rotated so as to align the pointer 83 with a single stone roll position indicia 87. When the proper adjustment is complete, the plate bolts are tightened so as to secure the stone roll mount plate 80 to the sidewall 25. Again, the stone roll mount plate 80 discussed and illustrated is viewed from the left side of the feederhouse 25. However, identical components exist on the right side. For brevity only the left is discussed.

It will be obvious to those skilled in the art that various changes may be made without departing from the scope of the invention and the invention is not to be considered limited to what illustrated in the drawings and described in the specification.

What is claimed is:

1. A pivoting faceplate on a feederhouse of an agricultural combine, comprising:

a. said feeder house having a sidewall, said sidewall having a plurality of faceplate position indicia;

b. a pivoting faceplate pivotally attached to the sidewall by a pivot, said faceplate having an indicator aperture, therein, said aperture capable of alignment allowing a single faceplate position indicia to be viewed; and c. a header affixed to the pivoting faceplate.

2. The pivoting faceplate described in claim 1, further comprising:

a. a faceplate adjustment rod attached to the faceplate and the sidewall;

b. said sidewall having a plurality of arcuate slots, therein; and c. said faceplate having a clamping means inserted into a single arcuate slot, said clamping means for affixing the faceplate to the feederhouse.

3. The pivoting faceplate described in claim 2, wherein the header further comprising:

a. a header frame having a trough pin, b. a top frame attached to the header frame, c. a trough frame attached to the header frame, d. an auger trough supported by the trough frame, and e. a sicklebar cutter attached to the auger trough.

4. The pivoting faceplate described in claim 3, wherein the faceplate further comprises:

a. a header cradle for supporting the header frame; and b. a trough pin attach for attachment to the trough pin.

5. A method for adjusting the position a pivoting faceplate on a feederhouse of an agricultural combine, comprising the steps of:

a. loosening a clamping means on a pivoting faceplate;

b. adjusting a nut on a faceplate adjustment rod allowing the pivoting faceplate to rotate about a pivot relative to a sidewall;

c. observing a single faceplate position indicia through an indicator aperture; and d. tightening the clamping means.

* * * * *